United States Patent [19]

Loizeau

[11] Patent Number: 4,556,135
[45] Date of Patent: Dec. 3, 1985

[54] TORSION DAMPING DEVICE

[75] Inventor: Pierre Loizeau, Ville d'Avray, France

[73] Assignee: Valeo, Paris, France

[21] Appl. No.: 533,948

[22] Filed: Sep. 20, 1983

[30] Foreign Application Priority Data

Sep. 27, 1982 [FR] France .................. 82 16214

[51] Int. Cl.$^4$ ............................................. F16D 3/14
[52] U.S. Cl. ............................ 192/106.2; 192/70.17; 464/82
[58] Field of Search ............... 192/70.17, 70.18, 106.1, 192/106.2; 464/81, 82, 100, 101

[56] References Cited

U.S. PATENT DOCUMENTS

| 3,362,512 | 1/1968 | Ericson | 192/70.17 |
| 3,375,911 | 4/1968 | Smirl | 464/82 X |
| 3,684,070 | 8/1972 | Maucher | 192/106.2 |

FOREIGN PATENT DOCUMENTS

| 1096443 | 6/1955 | France . |
| 2256686 | 7/1975 | France . |
| 2493447 | 5/1982 | France . |
| 2499181 | 8/1982 | France . |
| 2499182 | 8/1982 | France . |
| 2493446 | 1/1983 | France . |
| 764016 | 12/1956 | United Kingdom . |
| 768290 | 2/1957 | United Kingdom . |

Primary Examiner—Stephen F. Husar
Attorney, Agent, or Firm—Charles A. Brown; Charles E. Brown

[57] ABSTRACT

A torsion-damping device of the kind comprising two rotary parts capable of limited relative angular displacement with elastic means interposed circumferentially between the two rotary parts, incorporates an elastically deformable arm extending between two bearing elements one of which is fixed in rotation to one of the rotary parts. This bearing element incorporates at least two radially projecting barbs which are forceable engaged axially in a bearing surface of the respective rotary part and between which it is elastically deformable radially and circumferentially. The invention is especially applicable to damping hubs for clutch plate assemblies in motor vehicles.

8 Claims, 6 Drawing Figures

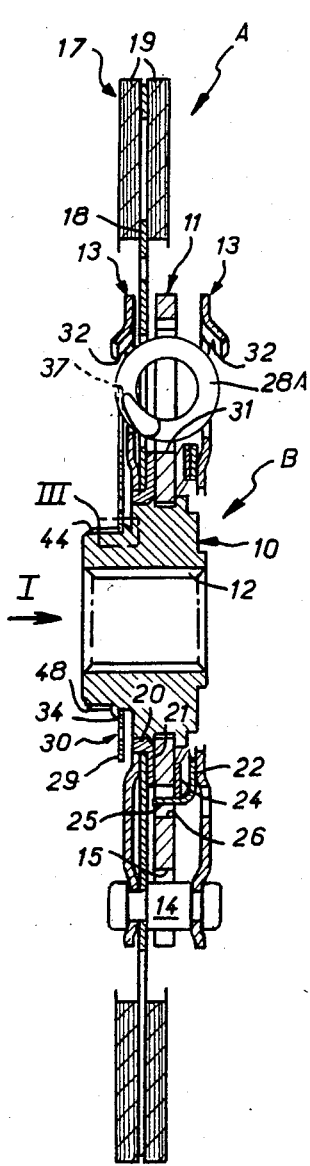
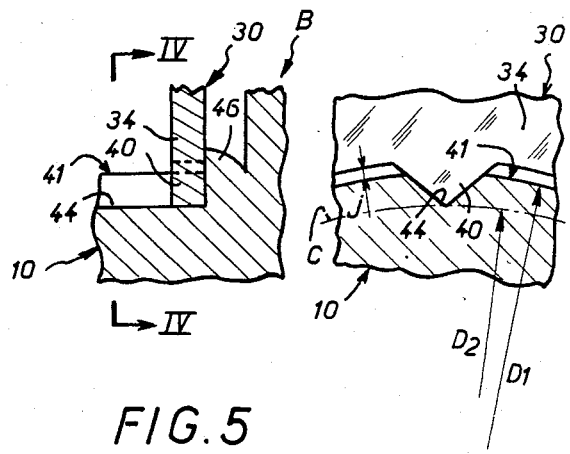
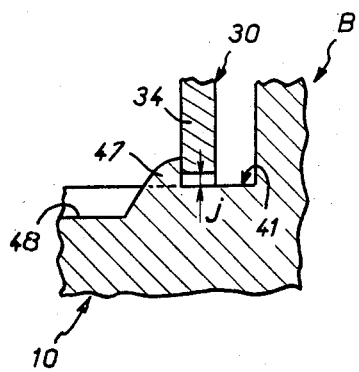
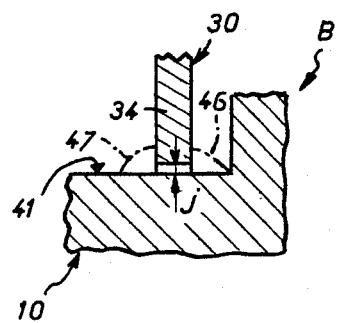

TORSION DAMPING DEVICE

BACKGROUND TO THE INVENTION

The present invention relates, in general terms, to torsion-damping devices comprising at least two coaxial parts mounted rotatably relative to one another within the limits of a specific angular movement and against the action of elastic means designed to act circumferentially between them, referred to below for the sake of convenience as elastic means with circumferential action.

As is known, such a torsion-damping device is conventionally employed in a clutch plate assembly, especially for a motor vehicle, in which case one of its rotary parts comprises a friction disc intended to be fixed in rotation to a first shaft, in practice a drive shaft, for example the output shaft of the engine in the case of a motor vehicle, whilst another of the said rotary parts is carried by a hub intended to be fixed in rotation to a second shaft, in practice a driven shaft, for example the input shaft of a gearbox in the case of such a motor vehicle.

Such a torsion-damping device makes it possible to ensure controlled transmission of the torque applied to one of its rotary parts when the other is itself subjected to a torque, that is to say to filter the vibrations liable to arise over the entire length of the kinematic chain which extends from the engine to the controlled wheel shafts in the case of a motor vehicle.

The elastic means with circumferential action usually consist of springs of the helical-spring type which extend substantially tangentially to a circumference of the assembly and which, each individually, are arranged partly in a receptacle provided for this purpose in one of the rotary parts in question and partly in a receptacle likewise provided for this purpose in the other of the said rotary parts.

Also, more often than not, these elastic means with circumferential action are distributed in what is commonly called several "stages" which are of different rigidities and the intervention of which is adjusted as a function of the angular movement between the two rotary parts in question; only a first of these stages of relatively low rigidity intervenes at the start of this movement, and, in proportion to the development of the latter, one or more other stages of relatively higher rigidity subsequently add their own effects to those of the first.

In practice, for each of the springs of the stages of relatively high rigidity, the intervention of which is to be delayed in this way, a certain play is provided circumferentially for this purpose between the end edge of the receptacle, in which such a spring is located in one of the rotary parts in question, and the corresponding end edge of the receptacle in which it is located in the other of the said rotary parts.

In a given embodiment, this play is not necessarily the same for both directions of change in the angular movement between the rotary parts in question; it can, for example, be greater for that direction of change which corresponds to operation of the assembly in "traction", and is consequently less for that direction which corresponds to the operation of the latter "on the overrun".

Likewise, for a given total play, the relative values of this play for both of the directions of change in the angular movement are not necessarily the same for all the practical embodiments liable to arise.

The present invention is intended more particularly for the case where, in addition to the springs used in this way, the elastic means with circumferential action, interposed between the two rotary parts in question, incorporate at least one elastically deformable arm which, extending between two bearing elements, one designed to be fixed in rotation in a positive way to one of the said rotary parts and the other being provided with drive means designed to connect it in rotation to the other of the said rotary parts over at least one range of the angular movement between these, is cut out in one piece with the said bearing elements from a blank of small thickness.

Such an arrangement, which can advantageously make it possible to minimise the number of receptacles to be provided for springs in the two rotary parts in question, is described particularly in the French Patent filed on 3rd Nov. 1980 under No. 80/23,447 and published under No. 2,493,446, in which, in practice, the elastically deformable arm or arms used in this way constitute the first stage of relatively low rigidity of the corresponding elastic means circumferential action, instead of springs.

In this French Patent, pins or the like are provided more particularly for fixing one of the bearing elements of such an elastically deformable arm positively to one of the rotary parts in question.

Although such an arrangement is satisfactory, it has disadvantages, especially in that it is necessary to make perforations for installing such pins.

The subject of the present invention is, in general terms, an arrangement making it possible to avoid this disadvantage and resulting in other advantages.

SUMMARY

More specifically, its subject is a torsion-damping device, particularly a clutch plate assembly, of the type comprising at least two coaxial parts mounted rotatably relative to one another within the limits of a specific angular movement and counter to elastic means designed to act circumferentially between the said parts, called elastic means with circumferential action, the said elastic means with circumferential action incorporating at least one elastically deformable arm which, extending between two bearing elements, one designed to be fixed in rotation in a positive way to one of the said rotary parts and the other being provided with drive means designed to connect it in rotation to the other of the said rotary parts over at least one range of the angular movement between these, is cut out in one piece with the said bearing elements from a blank of small thickness, this torsion-damping device being characterised in that the said bearing element which is fixed in rotation in a positive way to one of the rotary parts incorporates, projecting radially from it, at least two barbs which are forceably engaged axially in a bearing surface of the said rotary part and between which the said bearing element is elastically deformable radially and circumferentially.

In practice, the bearing element in question incorporates, distributed circularly, a plurality of barbs, but in limited numbers, for example three.

At all events, when they engage in the relevant bearing surface of one of the rotary parts in question, these barbs machine axially on the surface of the latter furrows or grooves as a result of the upsetting of material, and the capacity for elastic deformation which the bearing element carrying them possesses radially and circumferentially makes it possible advantageously to mitigate the consequences of the unavoidable production tolerances between such a bearing element and such a rotary part and/or to compensate the plays which inevitably arise during operation between the barbs of this bearing element and the furrows or grooves machined by them.

This compensates for the fact that because of construction these barbs are cut out from a blank of relatively reduced thickness.

Of course, it is already known, particularly from the French Patent filed on Dec. 28th 1973 under No. 73/46,897 and published under U.S. Pat. No. 2,256,686, to join together two concentric components by providing on one of them teeth which, when it is fitted onto the other, machine furrows in the surface of the latter.

However, apart from the fact that, in this French Patent, such an arrangement is used for fastening to a hub not an element bearing an elastically deformable arm of small thickness, but a simple relatively thick disc, the teeth which this disc thus possesses are contiguous, immediately following one another circularly, so that there is a relatively large number of them and so that between such teeth disc does not possess any particular capacity for elastic deformation radially and/or circumferentially.

The reason for this is, in particular, that during operation a relatively high torque must pass from the disc to the hub via these teeth.

The same does not apply in this case to the elastically deformable arm or arms of the bearing element in question, belonging to a stage of relatively low rigidity of the elastic means with circumferential action, so that the torque to be transmitted by means of this stage, and therefore the torque which, via the barbs of this bearing element, must pass from the latter to the rotary part in question, is always relatively low.

It is for the very reason that the torque to be transmitted is therefore relatively low that the arrangement according to the invention can be envisaged in combination with, on the one hand, a reduction in the number of teeth or barbs used and, on the other hand, the joint development of a capacity for radial and circumferential deformation in the relevant bearing element between two of these teeth or barbs.

However, the arrangement according to the invention also results in other advantages.

First of all, it makes it possible advantageously to make do with a single bearing surface for the component of the rotary part in question, on which the bearing element of one or more elastically deformable arms is fitted, whereas in the French Patent mentioned above the corresponding component has axially in succession two cylindrical bearing surfaces separated from one another by a transverse shoulder of small extent.

Furthermore, without prejudging the angular orientation to be given to the relevant bearing element in relation to the axis of the assembly, it makes it possible, if desired, to adjust as required, before the axial engagement of this bearing element on the bearing surface provided for this purpose on one of the rotary parts in question, particularly as a function of possible special manufacturing and/or production requirements to be observed, the angular orientation at rest of this rotary part in relation to the other rotary part with which it is associated.

In other words, by means of the arrangement according to the invention, it is possible to adjust, as desired and according to the requirements prevailing at any particular time, in one direction or the other, the circumferential play which exists at rest between the end edges of the receptacles, in which, as regards one of the rotary parts in question, are arranged the springs belonging to the other stages of the elastic means with circumferential action used, and the corresponding edges of the receptacles in which, as regards the other of the said rotary parts, these same springs are likewise arranged.

This results advantageously in a simplification of production, since one and the same arrangement is equally suitable for different productions, and consequently, overall, in a general saving in the assembly as a whole.

BRIEF DESCRIPTION OF THE DRAWINGS

FIG. 2 is a view of this in an axial section along the broken line II—II of FIG. 1;

FIG. 3 repeats on a larger scale the details of FIG. 2 identified by an insert III in the latter;

FIG. 4 is, on the scale of FIG. 3, a partial view of the torsion-damping device in a cross-section along the line IV—IV of FIG. 3;

FIGS. 5 and 6 are partial views of this, on the scale of FIG. 3, in an axial section respectively along the lines V—V and VI—VI of FIG. 1.

DESCRIPTION OF THE PREFERRED EMBODIMENTS

Figure 1:
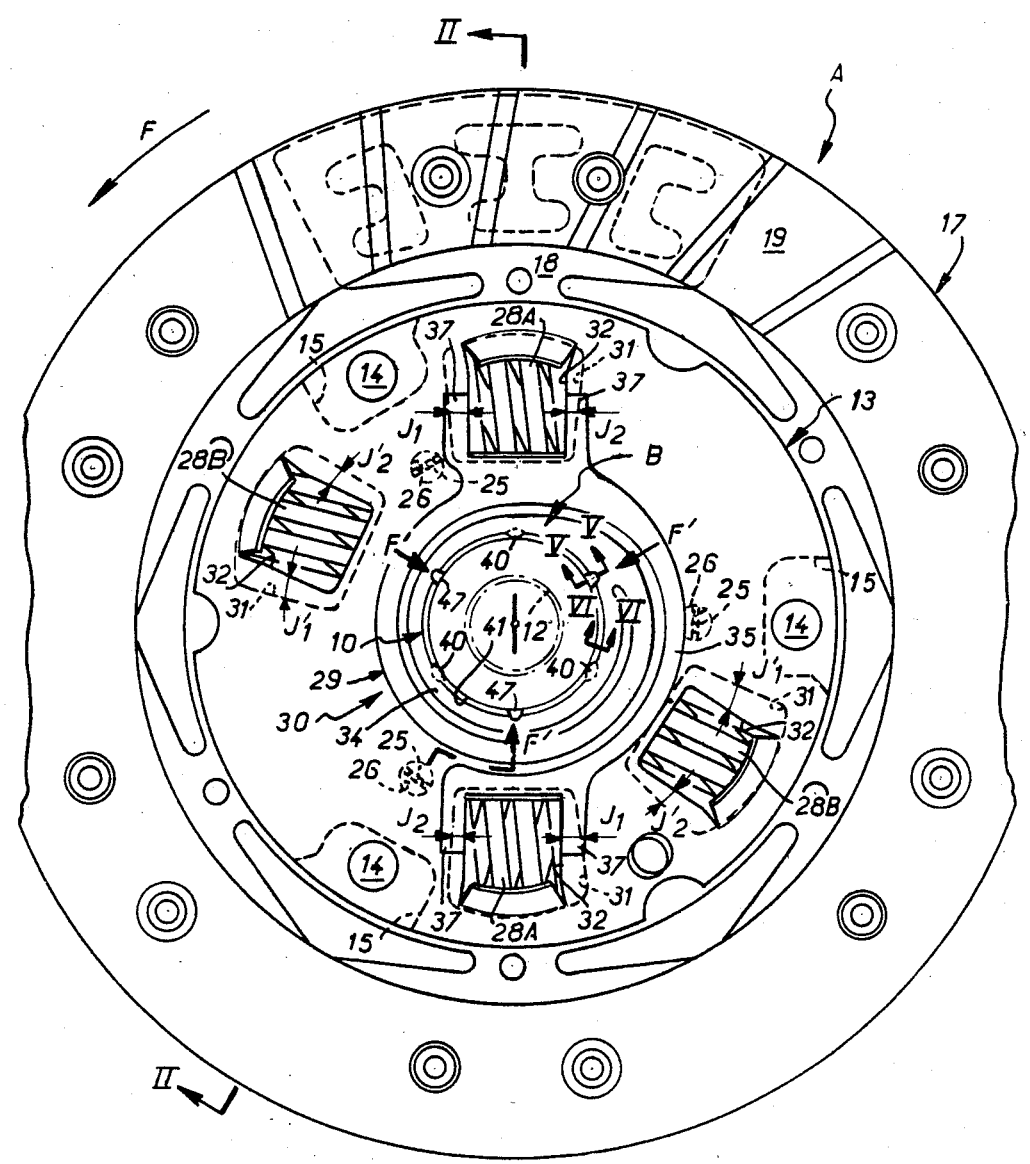
FIG. 1 is a partial elevation view of a torsion-damping device according to the invention.

In these Figures, the torsion-damping device in which the invention is used constitutes, by way of example, a clutch plate assembly with a damping hub, especially for a motor vehicle.

In the embodiment illustrated, this clutch plate assembly comprises two coaxial parts, namely a driving part A and a driven part B which are mounted rotably relative to one another within the limits of a specific angular movement and against the action of elastic means designed to act circumferentially between them; subsequently referred to as elastic means with circumferential action.

The driven part B comprises a hub 10 and a hub disc 11 which extends transversely round the hub 10 and which is fixed to the latter.

The hub 10 is designed to be engaged on a shaft, in practice a driven shaft, for example the input shaft of the gearbox, in the particular case, of a clutch plate assembly for a motor vehicle.

To fix it in rotation to such a shaft, the hub 10 in the embodiment illustraed has splines 12 on its inner periphery.

The driving part A comprises two guide washers 13 which extend transversely round the hub 10 on either side of the hub disc 11 and at a distance from the latter and which are fixed to one another by spacers 14 passing with play through notches 15 provided for this purpose on the periphery of the said hub disc 11.

In the embodiment illustrated, there are three of these spacers 14; each having a circular cross-section.

The driving part A also incorporates a friction disc 17 which, via a disc 18, is fixed to the guide washers 13 by means of the axial spacers 14. Friction linings 19 are fixed to the periphery of the disc 18 on either side.

Such a friction disc 17 is intended to be clamped by means of its friction linings 19 between two plates fixed in rotation to a second shaft, in practice a drive shaft, the output shaft of the engine, in this particular case, of a clutch plate assembly for a motor vehicle.

In the embodiment illustrated, the friction disc 17 is coupled by means of its disc 18 to one of the guide washers 13, and located between the periphery of the assembly formed in this way and the hub 10 is a bearing 20 to which is fixed a radial collar 21 inserted axially between the said assembly and the hub disc 11.

Between the rotary parts A, B formed in this way there are friction means with which axially acting elastic clamping means are associated.

In the embodiment illustrated, these friction means consist of a friction washer 22 which is applied to the guide washer 13 opposite that with which the bearing 20 and the radial collar 21 are associated, and which by means of axial lugs 25 engaged for this purpose in recesses 26 in the hub disc 11, the associated axially acting elastic clamping means consisting moreover of an elastic washer 24 of the "ONDUFLEX" type, which, bearing on the hub disc 11, permanently stresses the friction washer 22 in the direction of the guide washer 13 with which it is in contact.

The elastic means with circumferential action, interposed between the rotary parts A, B, comprises springs 28A, 28B of the helical-spring type and an elastically deformable arm 29 cut out from a blank of small thickness 30.

In the embodiment illustrated, two springs 28A are provided in positions diametrically opposite one another, and, alternating with these, two springs 28B are also provided in positions diametrically opposite one another.

These springs 28A, 28B which extend substantially tangentially to a circumference of the assembly are arranged partly in receptacles provided for this purpose in the rotary part B, namely apertures 31 in the hub disc 11, and partly in receptacles provided for this purpose in the rotary part A, namely apertures 32 in the guide washers 13.

In practice, in the configuration at rest of the assembly, as shown in FIG. 1, the springs 28A, 28B are engaged without play in the apertures 32 in the guide washers 13, but the circumferential extent of the apertures 31 in the hub disc 11 is greater than that of the apertures 32, so that in the said configuration of rest there exists, at each of the ends of the springs 28A, 28B, a circumferential play between such an end and the corresponding radial edge of the aperture 31 of the hub disc 11, in which such a spring 28A, 28B is accommodated.

As regards the circumferential direction identified by the arrow F in FIG. 1, which corresponds to the most frequent direction of rotation of the assembly, that is to say that relating to forward movement of the vehicle, and which likewise corresponds to an operation of this assembly in "traction", this play, measured angularly, has a value J′1 for the springs 28A and a value J′1, greater than the preceding value, for the springs 28B.

As regards the circumferential direction opposite the preceding one, which corresponds to an operation of the assembly "on the overrun", this play, measured angularly, has for the springs 28A a value J2 less than that of the corresponding play J1, and likewise for the springs 28B it has a value J′2 less than that of the corresponding play J′1.

As regards the elastically deformable arm 29, this extends between two bearing elements 34, 35 with which it is cut out in piece from the corresponding blank 30.

In the embodiment illustrated, the bearing element 34, which is radially the innermost and which, by means described in detail below, is designed to be fixed in rotation in a positive way to one of the rotary parts A, B, in practice the rotary part B, consists of a circularly continuous washer.

In conjunction with this, the bearing element 35, which is radially the outermost and which is provided with drive means designed to connect it in rotation to the other of the rotary parts A, B, in practice the rotary part A, over at least one range of the angular movement between the said rotary parts A, B consists of a circular segment which extends substantially over 180° and which has, projecting radially outwards at each of its end, a pair of radial fingers 37 for engagement for example without play, as illustrated, on the springs 28A.

These radial fingers 37 constitute the drive means for this, as will be described below.

In practice, in the embodiment illustrated, the elastically deformable arm 29 extends over a little less than 360° from a first end, by means of which it is substantially continuous with the circular segment constituting the bearing element 35, to a second end by means of which it engages radially with the washer constituting the bearing element 34.

These arrangements are well known per se, particularly from the French Patent mentioned above, and they will therefore not be described in detail here.

Bearing element 34 is fixed in rotation to the rotary parts B and incorporates, projecting radially from it, at least two barbs 40 which are forceably engaged axially in a bearing surface 41, of different transverse dimensions, of the said rotary part B and between which the said bearing element 34 is elastically deformable radially and circumferentially.

The angle at the centre between two barbs 40 is always relatively large and is preferably always at least 30°. In the embodiment illustrated, only three barbs 40 are thus provided, and, since these barbs are uniformly distributed circularly, the angle at the centre between any two successive barbs is equal to 120°.

In the embodiment illustrated, each of the barbs 40 has a triangular contour, and the angle at the vertes of such a barb 40 is greater than 90° and is, for example, as illustrated, in the neighbourhood of 120°.

The barbs 40 extend on the inner periphery of the washer constituting the bearing element 34 to interact with a bearing surface 41 of the hub 10 of the rotary part B.

As will be noted, this bearing surface 41 is the only one.

In practice, it extends axially on the outside of the guide washer 13 with which a bearing 20 and a radial collar 21 are associated, and the blank 30 from which the elastically deformable arm 29 and its bearing elements 34, 35, are cut out is itself transversely arranged on the outside of the volume delimited by the two guide washers 13.

Between the barbs 40 there is a radial play j between the washer constituting the bearing element 34 and the bearing surface 41 of the hub 10 of the rotary part B.

Between two barbs 40, this washer can thus effectively elastically exercise play radially in relation to this hub 10, as indicated by arrows F' in FIG. 1, as well as circumferentially.

The conventional part of the bearing surface 41 of the hub 10 has transversely a diameter D1 greater than that D2 of the circumference C on which is located the end point of the barbs 40, as indicated by broken lines in FIG. 4.

Furthermore, the material constituting the blank 30, and threfore these barbs 40, has a hardness higher than that of the material constituting the hub 10.

For example, the blank 30 can be made of hardened and/or cyanide-hardened steel, and the hub 10 can be made only of medium-hard steel.

The blank 30 is forceably engaged on the hub 10, more specifically on the bearing surface 41 of the latter, for example after the assembly has been fitted together.

During this engagement, the barbs 40 which it incorporates machine on the bearing suface 41 of the hub 10 furrows or grooves 44 of complementary transverse contour.

The engagement of the blank 30 on the hub 10 is continued until this blank 30 is engaged firmly with the springs 28A, as mentioned above, by means of the radial fingers 37 of the circular segment constituting the bearing element 35.

The configuration of rest of the assembly is determined thereby, the guide washers 13 of the rotary part A being wedged on the springs 28A and these being in turn wedged on the rotary part B by means of the blank 30.

In other words, in this configuration of rest, the circumferential plays J1, J2, J'1, J'2 mentioned specifically above are determined.

However, as will be understood, before the blank 30 is put in place, it is possible, as required, to give the rotary part B any angular orientation in relation to the rotary part A about the axis of the assembly and within the limits of the total circumferential play J1+J2 associated with the springs 28A.

As a result, it is possible, without modifying the elements used, to adjust, as desired, the relative value of the plays J1, J2 and consequently J'1, J'2 for the configuration of rest of the assembly.

It is sufficient, for this purpose, before the blank 30 is fitted, to give a suitable angular orientation to the rotary part B in relation to the rotary part A, and the blank 30, after it has been fitted, automatically fixes in a definitive way, as mentioned specifically above, the configuration of rest selected in this way for the assembly.

Moreover, during the fitting of the blank 30 on the bearing surface 41 of the hub 10, each of the barbs 40 axially displaces material from the hub 10, and the latter forms locally a bead 46 at the end of the corresponding furrow 44.

Thus, on the axially inner side of the washer forming the bearing element 34, each of the barbs 40 is axially up against such a local bead 46 on the corresponding bearing surface 41 of the rotary part B in question.

Because of the elastic clamping force to which the barbs 40 are subjected and also because the blank 30 does not undergo any axial force, no special measure need normally be taken to retain this blank axially on the hub 10.

However, if desired and as illustrated, there can be for safety's sake, on the axially outer side of the washer forming the bearing element 34, crimping beads 47 which, originating as a result of the upsetting of material of the bearing surface 41 of the hub 10, are in contact with the said washer, preferably without disturbing its capacity for elastic radial deformation.

In fact, and without any increase in costs, such crimping beads 47 can be formed even during the positioning of the blank 30.

Consequently, these crimping beads 47 are each individually arranged circularly between two barbs 40 at the end of an individual axial furrow 48 resulting from their formation.

For the assembly to operate in "traction", (the direction of rotation of the said assembly being that identified by the arrow F in FIG. 1) a torque is applied in an increasing trend to the rotary part A, and this torque is initially transmitted via the single elastically deformable arm 29 to the rotary part B, as described in detail in the French Patent mentioned above.

This first operating phase continues until the circumferential play J1 is absorbed.

The springs 28A are activated in turn, adding their effects to that of the elastically deformable arm 29 which remains tensioned.

Then, when the circumferential play J'1 is absorbed in turn, the springs 28B are also activated, adding their effects to those of the springs 28A and of the elastically deformable arm 29, until, because the turns of at least any one of these springs become contiguous to one another or because the spacers 14 come up against the corresponding radial edge of the notches 15 in the hub disc 11, through which they pass, there is direct positive drive of the rotary part B by the rotary part A, the transmitted torque then being sufficient.

For a decreasing trend in the torque between these rotary parts, corresponding to an operation of the assembly "on the overrun", a process opposite that described briefly above takes place, until, if appropriate, the said assembly returns to its initial configuration of rest.

Provided that there remains a capacity for elastic radial and circumferential deformation of the relevant bearing element between two barbs, there can be any number of barbs which the latter possesses to fix it in rotation to the rotary parts in question.

Furthermore, this rotary part is not necessarily the radially innermost rotary part, but may be the radially outermost rotary part, in which case the barbs possessed by the corresponding bearing element project, for example, on the outer periphery of the latter.

Finally, the scope of application of the invention is also not limited to that of torsion-damping devices comprising only two coaxial parts mounted rotatably relative to one another, but also extends to that of torsion-damping devices comprising a greater number of such parts.

I claim:

1. A torsion-damping device comprising at least two coaxial rotary parts mounted rotatably relative to one another within the limits of predetermined angular movement and against circumferentially acting elastic means arranged to act circumferentially between said parts, said circumferentially acting elastic means comprising at least one elastically deformable arm which extends between a first bearing element fixed for rotation with one of said rotary parts and a second bearing element having drive means for rotational connection with the other said rotary parts over at least a range of the predetermined angular movement, said arm being formed in a thin member in one piece with said bearing elements, wherein said first bearing element comprises at least two radially projecting barbs which are axially force-fitted in a bearing surface of said one rotary part, said first bearing element being radially and circumferentially elastically deformable between said projecting barbs.

2. A torsion-damping device according to claim 1, wherein said first bearing element comprises a plurality of said barbs arranged circularly.

3. A torsion-damping device according to claim 2, wherein said two barbs subtend a central angle of at least 30°.

4. A torsion-damping device according to claim 1, wherein between said two barbs there is a radial play between said first bearing element and said bearing surface of said one rotary part.

5. A torsion-damping device according to claim 1, wherein said barbs have a triangular contour.

6. A torsion-damping device according to claim 5, wherein the angle at the apex of each of said barbs is greater than 90°.

7. A torsion-damping device according to claim 1, wherein, on the axially inner side of said first bearing element, each of said barbs is axially up against a swaged local bead on said bearing surface of said one rotary part adapted to be formed by cold flow of the bearing surface material.

8. A torsion-damping device according to claim 7, wherein, on the axially outer side of said first bearing element there are provided circularly between said barbs, crimping beads adapted to be formed by cold flow of the bearing surface material on said one rotary part.

* * * * *